United States Patent
Bao et al.

(10) Patent No.: US 10,558,756 B2
(45) Date of Patent: *Feb. 11, 2020

(54) UNSUPERVISED INFORMATION EXTRACTION DICTIONARY CREATION

(71) Applicant: International Business Machines Corporation, Armonk, NY (US)

(72) Inventors: Sheng Hua Bao, San Jose, CA (US); Su Yan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 15/342,292

(22) Filed: Nov. 3, 2016

(65) Prior Publication Data

US 2018/0121443 A1    May 3, 2018

(51) Int. Cl.
| | |
|---|---|
| G06F 17/27 | (2006.01) |
| G06F 16/33 | (2019.01) |
| G06F 16/36 | (2019.01) |
| G06F 16/332 | (2019.01) |

(52) U.S. Cl.
CPC ...... *G06F 17/2785* (2013.01); *G06F 16/3322* (2019.01); *G06F 16/3338* (2019.01); *G06F 16/3344* (2019.01); *G06F 16/3347* (2019.01); *G06F 16/36* (2019.01); *G06F 17/271* (2013.01); *G06F 17/2735* (2013.01)

(58) Field of Classification Search
CPC ......... G06F 17/30292; G06F 17/30297; G06F 17/3097; G06F 17/30731
See application file for complete search history.

(56) References Cited

U.S. PATENT DOCUMENTS 7,092,941 B1 *   8/2006   Campos ............ G06F 17/30539
                                            707/737
10,255,323 B1 *   4/2019   Guo .................. G06F 16/24539
                                            (Continued)

FOREIGN PATENT DOCUMENTS

| JP | 2003173338 A | 6/2003 |
| JP | 2004185306 A | 7/2004 |

OTHER PUBLICATIONS

Anonymously; "Identification of Relevant Content for ICD-10 Coding in Electronic Health Records"; http://ip.com/IPCOM/0002455413D; Mar. 8, 2016.
(Continued)

*Primary Examiner* — James Trujillo
*Assistant Examiner* — J Mitchell Curran
(74) *Attorney, Agent, or Firm* — ZIP Group PLLC

(57) ABSTRACT

A data handling system enables the unsupervised creation of an information extraction dictionary by expanding upon a word or phrase included within an expansion query. Prior to receiving the expansion query, the data handling system performs an unsupervised learning of an information corpus which includes text to assign a corpus vector to each word and phrase of the text. After the expansion query, the data handling system compares the expansion query to the corpus vectors. The data handling system ranks the corpus vectors by similarity to the expansion query and provides a ranked list of words or phrases associated with the ranked corpus vectors. The ranked list may be subsequently utilized as the information extraction dictionary.

3 Claims, 8 Drawing Sheets

(56) References Cited

U.S. PATENT DOCUMENTS

| | | | | |
|---|---|---|---|---|
| 2008/0195601 A1* | 8/2008 | Ntoulas | ............... | G06F 16/313 |
| 2011/0055192 A1* | 3/2011 | Tang | ................... | G06F 16/3344 |
| | | | | 707/706 |
| 2011/0246465 A1* | 10/2011 | Koister | ............... | G06F 16/3347 |
| | | | | 707/737 |
| 2012/0078918 A1* | 3/2012 | Somasundaran | ..... | G06F 17/278 |
| | | | | 707/748 |
| 2013/0325759 A1* | 12/2013 | Rachevsky | ........... | G10L 15/063 |
| | | | | 706/12 |
| 2016/0321265 A1* | 11/2016 | Cevahir | ................ | G06F 16/285 |
| 2016/0350395 A1* | 12/2016 | Gupta | .................. | G06F 16/374 |
| 2017/0024186 A1* | 1/2017 | Fazl Ersi | .................. | G06F 7/20 |
| 2017/0235820 A1* | 8/2017 | Conrad | ............... | G06F 17/2211 |
| | | | | 707/728 |
| 2018/0075017 A1* | 3/2018 | Takase | ................ | G06F 17/2735 |

OTHER PUBLICATIONS

Microsoft; "Automatic discovery of training documents for text classifiers"; http://ip.com/IPCOM/000189107D; Oct. 26, 2009.

B. Apolloni et al., "Automatic Dictionary Creation by Sub-symbolic Encoding of Words," 2006.

Neelakantan, A., et al., "Learning Dictionaries for Named Entity Recognition Using Minimal Supervision," Apr. 24, 2015.

Toral, A, et al., "A Proposal to Automatically Build and Maintain Gazetteers for Named Entity Recognition By Using Wikipedia," 2006.

Kazama, J., et al., "ExploitingWikipedia as External Knowledge for Named Entity Recognition," Proceedings of the 2007 Joint Conference on Empirical Methods in Natural Language Processing and Computational Natural Language Learning, pp. 698-707, Prague, Jun. 2007.

Mikolov, T., et al. "Efficient Estimation of Word Representations in Vector Space," Sep. 2013.

Gruhl, D., "Semantic Artifacts/Glimpse," May 7, 2014.

Coden, A., et al., "Semantic Lexicon Expansion for Concept-based Aspect-aware Sentiment Analysis," Oct. 2014.

Bojanowski, P., et al. "Enriching Words Vectors with Subword Information," Jul. 15, 2016.

Mell, P., et al. "The NIST Definition of Cloud Computing," Recommendations of the National Institute of Standards and Technology, Sep. 2011.

List of IBM Patents or Patent Applications Treated as Related, filed herewith.

* cited by examiner

UNSUPERVISED INFORMATION EXTRACTION DICTIONARY CREATION

FIELD OF THE INVENTION

Embodiments of the invention generally relate to the unsupervised creation of an information extraction dictionary.

DESCRIPTION OF THE RELATED ART

Information extractions, such as named entity extractions, relationship extractions etc. enable more accurate document search, easier browsing of large document corpuses, and downstream analysis of many natural language processing (NLP) tasks. Information extraction dictionaries are used in information extraction systems. For instance, for the task of extracting disease names from a biological text corpus, an information extraction dictionary composing of all the known diseases is prepared and feed to an automated annotation program to identify and extract all mentions of each of the names in the dictionary from the biological text corpus.

However, preparing a dictionary is a time-consuming and expensive task that often requires deep knowledge of the corpus domain. Even when such an information extraction dictionary is available, it is seldom comprehensive as many words or phrases typically have several name variances and synonyms and it is difficult to include all the variances into the dictionary. Moreover, new words or phrases and variances of words or phrases constantly appear which makes it difficult for an information extraction dictionary to be comprehensive.

SUMMARY

In an embodiment of the present invention, a method of performing an unsupervised learning of text within an information corpus to generate a vector representation of every word or phrase of the text of the information corpus is presented. The method includes prior to a host device receiving an expansion query from a client device, assigning, with the host device, a corpus vector to each word and phrase within an information corpus stored within a data source local to the host system. The method also includes forming, with the host device, a plurality of clusters, each cluster including a plurality of similar corpus vectors. The method further includes indicating, with the host device, a particular corpus vector within each cluster as being a representative corpus vector of the cluster in which the particular corpus vector resides.

In another embodiment of the present invention a computer program product for performing an unsupervised learning of text within an information corpus to generate a vector representation of every word or phrase of the text of the information corpus is presented. The computer program product includes a computer readable storage medium that has program instructions embodied therewith. The program instructions are readable by a host device to cause the host device to prior to the host device receiving an expansion query from a client device, assign a corpus vector to each word and phrase within an information corpus stored within a data source local to the host system. The program instructions are further readable by the host device to cause the host device to form a plurality of clusters, each cluster including a plurality of similar corpus vectors. The program instructions are even further readable by the host device to cause the host device to indicate a particular corpus vector within each cluster as being a representative corpus vector of the cluster in which the particular corpus vector resides.

In yet another embodiment of the present invention, a computer for performing an unsupervised learning of text to generate a vector representation of every word or phrase of the text is presented. The computer includes a processor, an information corpus stored within a data source communicatively coupled to the processor, and a memory communicatively coupled to the processor. The memory is encoded with instructions, wherein the instructions when executed by the processor cause the processor to prior to the processor receiving an expansion query from a client device, assign a corpus vector to each word and phrase of text within the information corpus. The instructions when executed by the processor further cause the processor to form a plurality of clusters, each cluster including a plurality of similar corpus vectors. The instructions when executed by the processor even further cause the processor to indicate a particular corpus vector within each cluster as being a representative corpus vector of the cluster in which the particular corpus vector resides.

These and other embodiments, features, aspects, and advantages will become better understood with reference to the following description, appended claims, and accompanying drawings.

It is to be noted, however, that the appended drawings illustrate only example embodiments of the invention, and are therefore not considered a limitation of the scope of embodiments of the invention.

DETAILED DESCRIPTION

Embodiments relate to a data handling system enables the unsupervised creation of an information extraction dictionary by expanding upon a word or phrase included within an expansion query. Prior to receiving the expansion query, the data handling system performs an unsupervised learning of an information corpus which includes text to assign a corpus vector to each word and phrase of the text. After the expansion query, the data handling system compares the expansion query to the corpus vectors. The data handling system ranks the corpus vectors by similarity to the expansion query and provides a ranked list of words or phrases associated with the ranked corpus vectors. The ranked list may be subsequently utilized as the information extraction dictionary.

Figure 1:
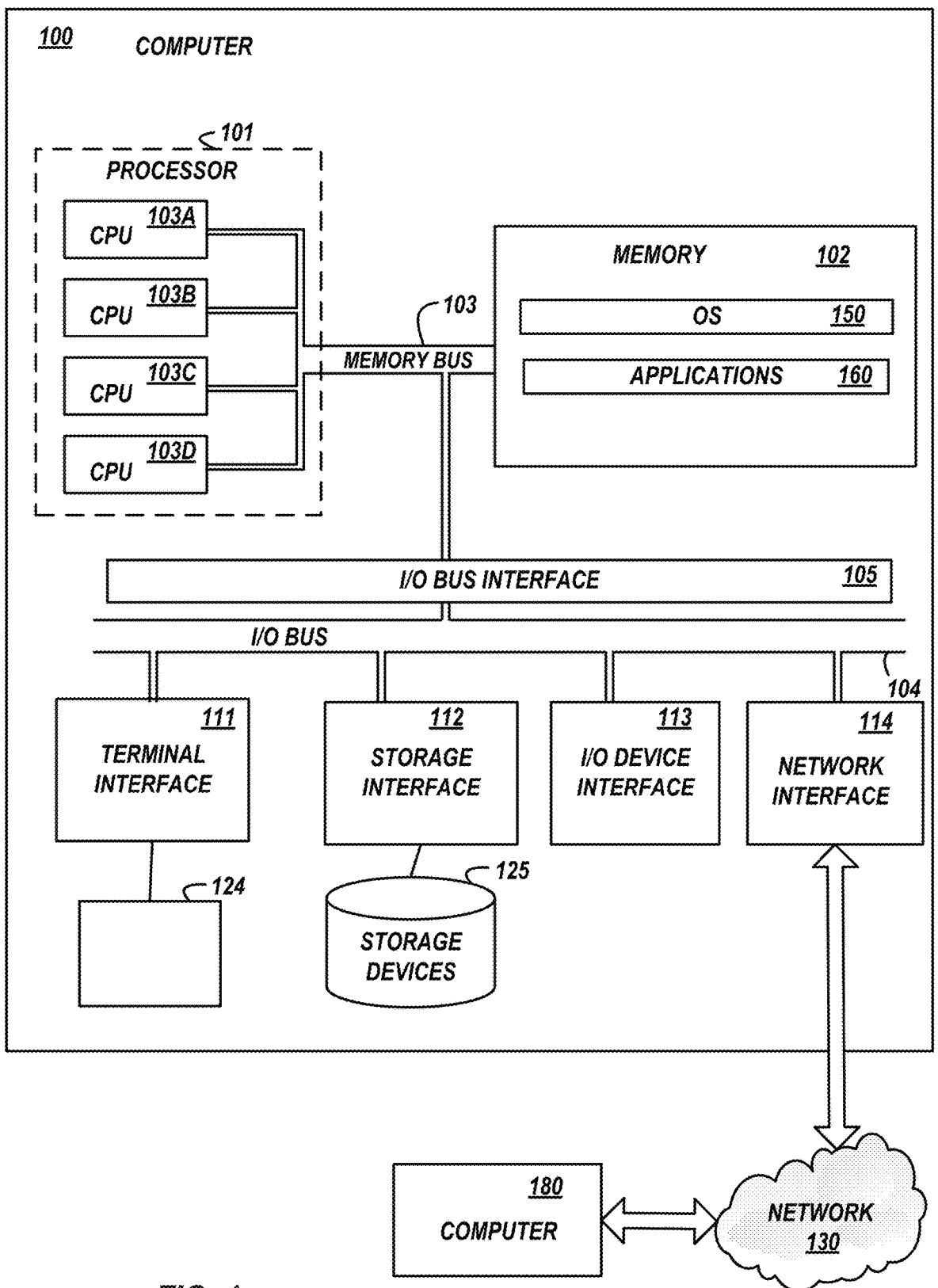
FIG. 1 illustrates a high-level block diagram of an exemplary computer for implementing various embodiments of the invention.

Referring to the Drawings, wherein like numbers denote like parts throughout the several views, FIG. 1 depicts a high-level block diagram representation of a computer 100 connected to another computer 180 via a network 130. Computer 180 may include the same components, fewer components, or additional components as computer 100. The term "computer" is used herein for convenience only, and in various embodiments is a more general data handling system, such as a mobile phone, tablet, server computer, wearable device, etc. The mechanisms and apparatus of embodiments of the present invention apply equally to any appropriate device. In a particular embodiment, computer 100 is a client computer such as desk top computer and computer 180 is a host computer such as a server. In particular embodiments, there may be multiple computers 100 and multiple computers 180. In these embodiments, each computer 100 is connected to at least one of the computers 180 via network 130 and the computers 180 may also be interconnected to one or more of the other computers 180 by the same or different network 130. The computer 180 or multiple computers 180 may be referred to herein as a host system.

The major components of the computer 100 may comprise one or more processor 101, system memory 102, terminal interface 111, storage interface 112, I/O (Input/Output) device interface 113, and/or network interface 114, all of which are communicatively coupled, directly or indirectly, via one or more busses, such as memory bus 103, I/O bus 104, an I/O bus interface unit 105, etc.

The computer 100 contains one or more general-purpose programmable central processing units (CPUs) 103A, 103B, 103C, and 103D, herein generically referred to as processor 101. In embodiments, the computer 100 contains multiple processors 101 typical of a relatively large system such as a server computer. Each processor 101 executes instructions stored in the system memory 102 and may comprise one or more levels of on-board cache. One of the multiple processors 101 may be a coprocessor. Generally, the coprocessor also executes instructions stored in the system memory 102 and may comprise one or more levels of on-board cache. The coprocessor generally allows the processor 101 to offload the execution of some instructions stored in the system memory 102 allowing the processor 101 to execute other instructions stored in the system memory 102. The coprocessor may also operate upon data that was previously operated upon by the processor 101 or upon data that will be subsequently operated upon by the processor 101. The offloading to the coprocessor generally allows for improved efficiency of operating upon particular instructions stored in the system memory 102.

In an embodiment, the system memory 102 may comprise a random-access semiconductor memory, storage device, or storage medium for storing or encoding data and programs. In another embodiment, the system memory 102 represents the entire virtual memory of the computer 100, and may also include the virtual memory of other computers coupled to the computer 100 or connected via the network 130. The system memory 102 is conceptually a single monolithic entity, but in other embodiments the system memory 102 is a more complex arrangement, such as a hierarchy of caches and other memory devices. For example, memory 102 may exist in multiple levels of caches, and these caches may be further divided by function, so that one cache holds instructions while another holds non-instruction data, which are read or otherwise operated upon by the processor 101. Memory 102 may be further distributed and associated with different processors 101 or sets of processors 101, as is known in any of various so-called non-uniform memory access (NUMA) computer architectures.

The system memory 102 stores or encodes an operating system 150 and one or more applications 160. Although the operating system 150 and applications 160 are illustrated as being contained within the memory 102 in the computer 100, in other embodiments some or all of them may be on a different computer and may be accessed remotely, e.g., via network 130. The computer 100 may use virtual addressing mechanisms that allow the programs of the computer 100 to behave as if they only have access to a large, single storage entity instead of access to multiple, smaller storage entities. Thus, while operating system 150 and applications 160 are illustrated as being contained within the system memory 102, these elements are not necessarily all completely contained in the same storage device at the same time. Further, although operating system 150 and applications 160 are illustrated as being separate entities, in other embodiments some of them, portions of some of them, or all of them may be packaged together, etc.

In an embodiment, operating system 150 and applications 160 each comprise instructions or statements that execute on the one or more processors 101 and/or instructions or statements that are called by the instructions or statements that execute on the one or more processors 101 to carry out the functionality described below. When such program instructions are able to be run by the one or more processors 101, such computer becomes a particular machine configured to carry out such instructions.

One or more processors 101 or a component of the processor 101 may function as a general-purpose programmable graphics processor unit (GPU) that builds images (e.g. a GUI) for output to a display 124. The GPU, working in conjunction with one or more applications 160, determines how to manipulate pixels of display 124, such as touch screen, to create a display image or user interface. Ultimately, the image (e.g. GUI, etc.) is displayed to a user via display 124. The processor 101 and GPU may be discrete components interconnected by one or more busses or may be integrated into a single component.

The memory bus 103 provides a data communication path for transferring data among the processor 101, the system memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices integral within the computer 100. For example, the terminal interface unit 111 supports the attachment of one or more I/O devices, which may comprise user input output devices (such as a display 124, speaker, touchscreen, camera, touchpad, buttons, etc.). The user may manipulate the I/O devices using a user interface, in order to provide input data and commands to the user I/O devices or to computer 100, and may further receive output data. For example, the interface may be presented via the display 124, played via a speaker, or printed via a printer. The user interface may be a user interface that provides content to a user visually (e.g. via a screen), audibly (e.g. via a speaker), and/or via touch (e.g. vibrations, etc.). In some embodiments, the computer 100 itself acts as the user interface as the user may move the computer 100 in ways to interact with, input, or manipulate application 160 data, function, etc.

The storage interface unit 112 supports the attachment of one or more disk drives or storage devices 125. In an embodiment, the storage devices 125 are disk drive storage device(s), flash storage device(s), or the like, and in embodiments, the multiple devices are configured to appear as a single large storage device. The contents of the system memory 102, or any portion thereof, may be stored to and retrieved from the storage devices 125, as needed. The storage devices 125 generally have a slower access time than does the memory 102, meaning that the time needed to read and/or write data from/to the memory 102 is less than the time needed to read and/or write data from/to for the storage devices 125.

The I/O device interface 113 provides an interface to any of various other external input/output devices that are external to computer 100, such as a wearable device, a printer, etc. The network interface 114 provides one or more communications paths from the computer 100 to other data handling devices such as numerous other computers (e.g., computer 180); such paths may be comprised within, e.g., one or more networks 130.

Although the memory bus 103 is shown in FIG. 1 as a relatively simple, single bus structure providing a direct communication path among the processors 101, the system memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

Network interface 114 may contain electronic components and logic to adapt or convert data of one protocol on I/O bus 104 to another protocol. Therefore, network interface 114 may connect a wide variety of devices or other computers to computer 100 and to each other, such as, but not limited to, servers, computers, bus adapters, PCI adapters, PCIe adapters, NVLink adapters, or computer 180 using one or more protocols including, but not limited to, Token Ring, Gigabit Ethernet, Ethernet, Fibre Channel, SSA, Fibre Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics connections, etc.

Though shown as distinct entities, the multiple I/O interface units 111, 112, 113, and 114 or the functionality of the I/O interface units 111, 112, 113, and 114 may be integrated into the same device, adapter, etc.

In various embodiments, the computer 180 is a multi-user mainframe computer, a single-user system, a server computer, storage system, or similar device that has little or no direct user interface, but receives requests from other computers, such as computer 100. In such embodiments, the computer 100 may be implemented as a desktop computer, portable computer, laptop or notebook computer, tablet computer, pocket computer, telephone, smart phone, automobile infotainment console, teleconferencing system, appliance, or any other appropriate type of electronic device. In other embodiments, the computer 100 and computer 180 may be the same type of computer.

The network 130 may be any suitable network or combination of networks and may support any appropriate protocol suitable for communication of data and/or code to/from the computer 100 and at least the computer 180. In various embodiments, the network 130 may represent a data handling device or a combination of data handling devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100. The individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implemented e.g. upon computer 100 according to various embodiments of the invention may be implemented in a number of manners, including using various computer applications, routines, components, programs, objects, modules, data structures, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

Figure 2:
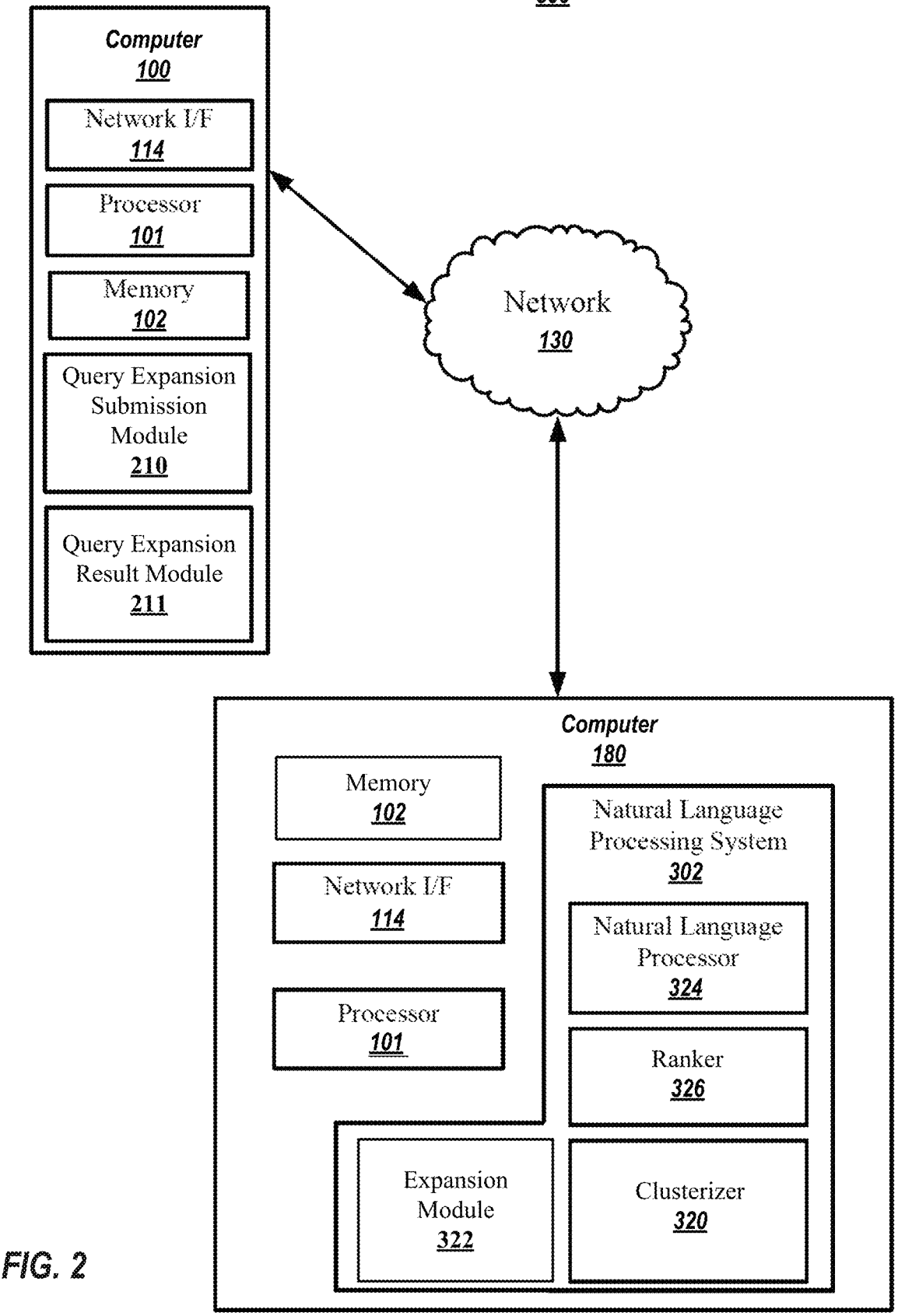
FIG. 2 illustrates a block diagram of an example computing environment in which illustrative embodiments of the present disclosure may be implemented.

FIG. 2 illustrates a block diagram of an example computing environment 300 in which illustrative embodiments of the present disclosure may be implemented. In some embodiments, the computing environment 300 includes computer 100 which is configured as a remote device, which may be referred to herein as remote device, and a computer 180 which is configured as a host device, which may be referred to herein as host device. Computer 180 may have the same, fewer, or greater computing components relative to computer 100, shown in FIG. 1.

In some embodiments, the remote device may enable users to submit (or may submit automatically with or without user input) electronic documents (e.g., web pages) containing one word or phrase, multiple words or phrases, ingested and analyzed (e.g., by natural language processing system 122). For example, the remote device may include query expansion submission module 210, query expansion result module 211, and an interface. The query expansion submission module 210 may be in the form of a web browser or any other suitable software module, and the interface may be any type of interface (e.g., command line prompts, menu screens, graphical user interfaces). The interface may allow a user to interact with the remote device to submit, using the query expansion submission module 210, one or more web pages containing an expansion query including one word or phrase, multiple words or phrases, etc.

In some embodiments, the expansion query submitted via query expansion submission module 210 may all belong to (or may have all been created on a website that is owned by) the same entity that is submitting them for analysis. In some other embodiments, the entity submitting the expansion query may be different from the entity that originally generated (e.g., sent) the expansion query. The term "expansion query" shall mean herein a data submission or transfer which contains at least one word or phrase that is received by a device which contains an information corpus that which various words or phrases therewithin may accurately expand upon the at least one word or phrase within the expansion query.

In some embodiments, the remote device may further include query expansion result module 211. This module may be configured to receive electronic documents (e.g., web pages), from the host device, of an ordered list of words or phrases that are similar to the word or phrase or words or phrases contained in the expansion query. In some embodiments, the ordered list may then be used by the remote device to aid users in determining which words or phrases in the ordered list are correctly similar to the word or phrase or words or phrases contained in the expansion query. For example, these rankings may incorporated (by either the remote device or the host device) into an information extraction dictionary used in an information extraction application that feeds the information extraction application to an annotation program to identify and extract all mentions of each of the words or phrases in the dictionary from a corpus.

In some embodiments, the host device may include a natural language processing system 302. The natural language processing system 302 may include a natural language processor 324, a ranker 326, a clusterizer 320, and an expander 322. The natural language processor 324 may include numerous subcomponents, such as a tokenizer, a part-of-speech (POS) tagger, a semantic relationship identifier, and a syntactic relationship identifier. An example natural language processor is discussed in more detail in reference to FIG. 3.

In some embodiments, natural language processor 324 may be configured to analyze an information corpus of text stored within one or more data sources locally accessible to natural language processor 324 in order to perform an unsupervised learning of the information corpus to generate a vector representation of every word or phrase of the text of the information corpus. The vectors of the words or phrases of the text of the information corpus may be further referred herein as corpus vectors. Natural language processor 324 may also generate a vector representation the word(s) or phrases(s) received by the host within the expansion query. The vector or vectors of the word(s) or phrase(s) of the text of the expansion query may be further referred herein as query vector(s).

In some embodiments, the clusterizer 320 may be configured to group similar corpus vectors into clusters and to determine and designate a particular corpus vector within each cluster to be a representative vector of the cluster.

In some embodiments, the expander 322 may be configured to receive the expansion query from query expansion submission module 210 of computer 100. The expander 322 may further retrieve the word(s) or phrases(s) within the expansion query and submits those word(s) or phrases(s) to natural language processor 324 in order for the natural language processor 324 to generate the query vector(s).

The expander 322 may further determine the most similar representative corpus vector(s) amongst the various representative corpus vectors in order to determine one or more most similar vector cluster(s). As such, the expander 322 may only consider the representative corpus vectors to determine which cluster or clusters are most similar to the query vector(s). The expander 322 may further determine the corpus vectors within the one or more most similar vector cluster(s) that are similar to the query vector(s).

Because the number of representative corpus vectors is considerably less than the overall number of corpus vectors, expander 322 may more quickly determine the one or more most similar clusters relative the time needed for a natural language processing system to find the most similar corpus vectors within the entire population of corpus vectors. Once the one or more most similar clusters are determined by expander 322, the sample size of the number of corpus vectors to be further analyzed for similarity to the query vector(s) is reduced relative to the entire population of corpus vectors. As such, expander 322 may more efficiently determine corpus vectors that are similar to the query vector(s).

In some embodiments, the ranker 326 may be configured to rank the corpus vectors within the one or more most similar clusters by similarity to the query vector(s). For example, the ranker 326 may indicate a particular corpus vector within a particular cluster as being the most similar vector within that cluster to the query vector.

In some embodiments, expander 322 may be configured to return a ranked list of words(s) or phrase(s) associated with the corpus vectors within the one or more most similar clusters ranked by ranker 326 to the query expansion result module 211 of the remote device.

In some embodiments, the natural language processing system 302 may further include a search application, web crawler, or other such text information retrieval system (not shown) in order to add to a pre-existing information corpus.

The search application may be implemented using a conventional or other search engine, and may be distributed across multiple computer systems. The search application may be configured to search one or more databases or other computer systems for text information related to one or pre-existing corpuses. For example, the search application may be configured to search one or more data sources in order to identify additional relevant text to add to the pre-existing corpuses.

While FIG. 2 illustrates a computing environment 200 with a single host device and a single remote device, suitable computing environments for implementing embodiments of this disclosure may include any number of remote devices and host devices. The various modules, systems, and components illustrated in FIG. 2 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to ingest corpuses and generate corpus vectors associated therewith, and the second host device may include a software module configured to receive an expansion query, generate query vector(s), submit the query vector(s) to the first host device, and receive similar corpus vectors from the first host device.

It is noted that FIG. 2 is intended to depict the representative major components of an exemplary computing environment 200. In some embodiments, however, individual components may have greater or lesser complexity than as represented in FIG. 2, components other than or in addition to those shown in FIG. 2 may be present, and the number, type, and configuration of such components may vary.

Figure 3:
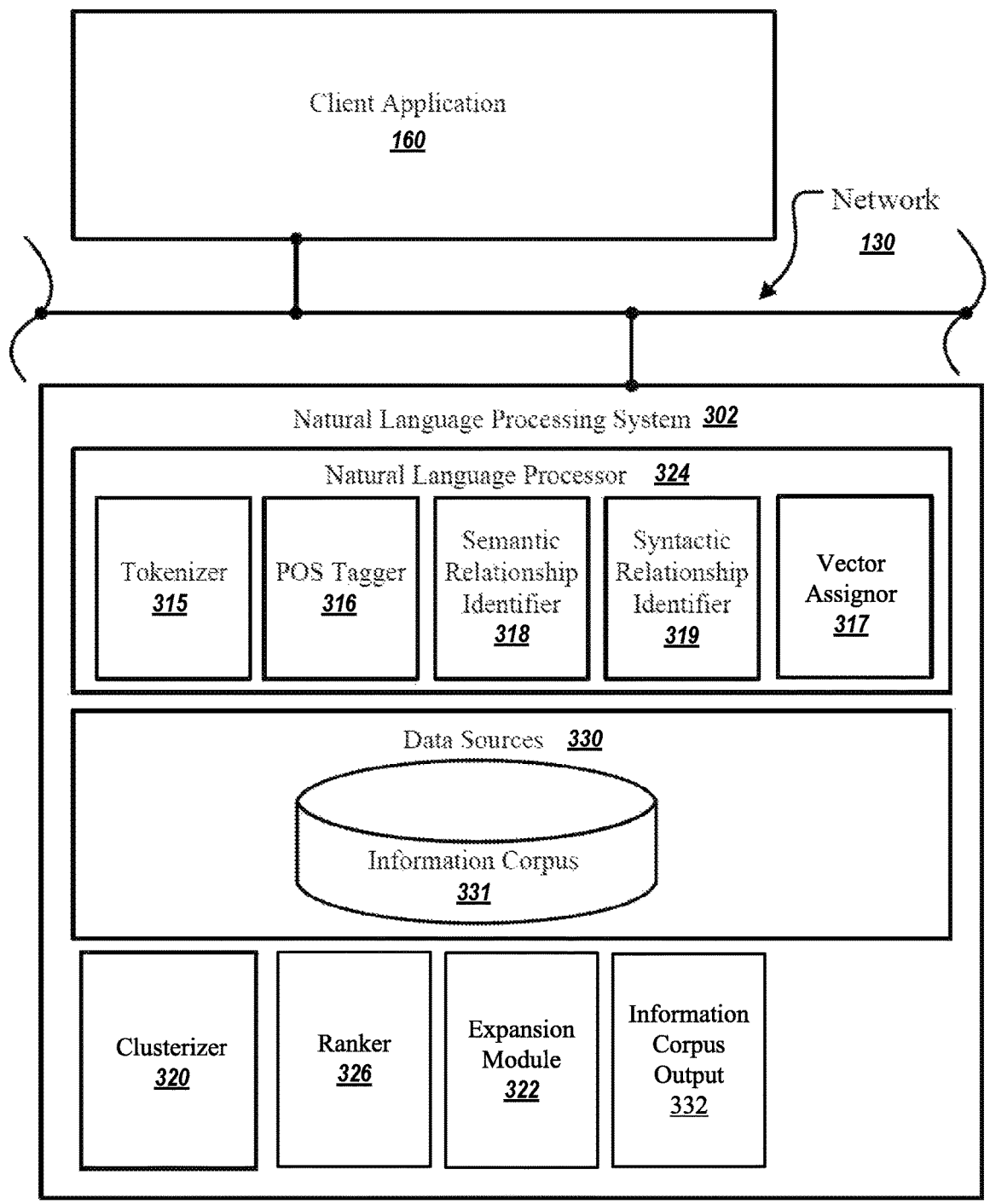
FIG. 3 illustrates a block diagram of an exemplary system architecture, including a natural language processing system, configured to use an expansion query to create a list of words or phrases that are similar to the expansion query, according to one or more embodiments of the present invention.

Referring now to FIG. 3, shown is a block diagram of an exemplary system architecture 301, including a natural language processing system 302, configured to analyze an information corpus 331 of text stored within one or more data sources 330 locally accessible to natural language processor 324 in order to perform an unsupervised learning of the information corpus 331 to generate and assign a corpus vector to each applicable word or phrase of the text of the information corpus 331.

In some embodiments, a remote device (such as computer 100 of FIG. 1) may submit an expansion query consisting of data structures, webpages, or the like that contain word(s) or phrase(s) to be expanded to form an information extraction dictionary. The information extraction dictionary may be subsequently feed to the automated annotation program to identify and extract all mentions of each of the names in the information extraction dictionary from a particular corpus. For clarity, information corpus 331 used to expand the word(s) or phrase(s) of the expansion query may be the same corpus that the automated annotation program identifies and extracts all mentions of each of the words or phrases in the information extraction dictionary therefrom. However, it is preferred that information corpus 331 is not the same corpus that the automated annotation program identifies and extracts all mentions of each of the words or phrases in the information extraction dictionary therefrom.

The expansion query is received by the natural language processing system 302 which may be housed on a host device (such as computer 180 of FIG. 1). Such a remote device may include a client application 160, which may itself involve one or more entities operable to generate or modify information in the expansion query that is then dispatched to a natural language processing system 302 via a network 130.

Consistent with various embodiments, the natural language processing system 302 may respond to expansion query submissions sent by the client application 160. Specifically, the natural language processing system 302 may compare the query vector(s) associated with the expansion query against preexisting corpus vectors within the natural language processing system 302 to determine similar preexisting corpus vectors. In some embodiments, the natural language processing system 302 may include a natural language processor 324, data sources 330, ranker 326, clusterizer 320, and expander 322.

The natural language processor 324 may be a computer module that analyzes text of information corpus 331 stored within one or more data sources 330 locally accessible to natural language processor 324 in order to perform an unsupervised learning of the information corpus 331 to generate a vector representation of every word or phrase of the text of the information corpus 331. Natural language processor 324 may also generate a vector representation the word(s) or phrases(s) received from the application 160 within the expansion query.

The natural language processor 324 may perform various methods and techniques for analyzing text within information corpus 331 (e.g., syntactic analysis, semantic analysis, etc.). The natural language processor 324 may be configured to recognize and analyze any number of natural languages. In some embodiments, the natural language processor 324 may parse passages of the text within information corpus 331. Further, the natural language processor 324 may include various modules to analyze text within information corpus 331. These modules may include, but are not limited to, a tokenizer 315, a part-of-speech (POS) tagger 316, a semantic relationship identifier 318, a syntactic relationship identifier 319, and vector assignor 317.

In some embodiments, the tokenizer 315 may be a computer module that performs lexical analysis. The tokenizer 315 may convert a sequence of characters into a sequence of tokens. A token may be a string of characters included in text within information corpus 331 and categorized as a meaningful symbol. Further, in some embodiments, the tokenizer 331 may identify word boundaries in text within information corpus 331 and break any text passages within the information corpus 331 into their component text elements, such as words, multiword tokens, numbers, and punctuation marks. In some embodiments, the tokenizer 331 may receive a string of characters, identify the lexemes in the string, and categorize them into tokens.

In some embodiments, the POS tagger 316 may be a computer module that marks up a word in text within the information corpus 331 to correspond to a particular part of speech. The POS tagger 316 may read a passage or other text in natural language and assign a part of speech to each word or other token. The POS tagger 316 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed information corpus 331 (e.g., the content of a first information corpus 331 may shed light on the meaning of text in another information corpus 331, particularly if the two corpuses are at least partially related). Examples of parts of speech that may be assigned to words include, but are not limited to, nouns, verbs, adjectives, adverbs, and the like. Examples of other part of speech categories that POS tagger 316 may assign include, but are not limited to, comparative or superlative adverbs, wh-adverbs, conjunctions, determiners, negative particles, possessive markers, prepositions, wh-pronouns, and the like. In some embodiments, the POS tagger 316 may tag or otherwise annotate tokens of text within the information corpus 331 with part of speech categories. In some embodiments, the POS tagger 316 may tag tokens of text within the information corpus 331 to be parsed by other components of the natural language processing system 324.

In some embodiments, the semantic relationship identifier 318 may be a computer module that is configured to identify semantic relationships of recognized text entities (e.g., words, phrases) within the information corpus 331. In some embodiments, the semantic relationship identifier 318 may determine functional dependencies between entities and other semantic relationships.

In some embodiments, the syntactic relationship identifier 319 may be a computer module that is configured to identify syntactic relationships in a passage composed of tokens. The syntactic relationship identifier 319 may determine the grammatical structure of sentences such as, for example, which groups of words are associated as phrases and which word is the subject or object of a verb. The syntactic relationship identifier 319 may conform to formal grammar.

In a particular embodiment, syntactic relationship identifier 319 may utilize a statistical parsing technique to determine the groups of words that are associated as phrases within text of the information corpus 331.

In another embodiment, syntactic relationship identifier 319 may utilize a frequency of co-occurrence of neighboring words technique to determine the groups of words that are associated as phrases within text of the information corpus 331. In a particular technique two consecutive words within text of the information corpus 331 are considered to be part of the same phrase if a phrase score is above a predefined threshold. The phrase score may be determined by the following model:

$$score_p = \frac{count(\omega_i \omega_j) - \delta}{count(\omega_i) \times count(\omega_j)}$$

where $count(\omega_i)$ is the number of instances the word $\omega_i$ occur individually, where $count(\omega_i \omega_j)$ is the number of instances the word $\omega_i, \omega_j$ occurs individually, where count $(\omega_i \omega_j)$ is the number of instances the words $\omega_i$ $\omega_j$ co-occur consecutively in the order of $\omega_i$ followed by $\omega_j$, and where $\delta$ is a threshold value used to prevent phrases with very infrequent words from being formed such that the bigrams $count(\omega_i \omega_j)$ with a value greater than $\delta$ are deemed phrases. This particular technique may be iterative such that a first iteration determines two word phrases within the text of information corpus 331 and a next iteration determines if any of the previously determined two word phrases are three word phrases within the text of information corpus 331, etc.

In some embodiments, vector assignor 317 may be a computer module that is configured to assign a vector to each identified word or phrase within the text of information corpus 331. Vector assignor 317 may utilize tokenizer 315, POS tagger 316, semantic relationship identifier 318, and syntactic relationship identifier 319 to assign a corpus vector to each identified word or phrase within the text of information corpus 331. As such, vector assignor 317 assigns a corpus vector to each identified word or phrase by considering the POS of the word or phrase, by considering the semantics of the word or phrase, and/or by considering the syntax of the word or phrase. In this manner, the corpus vector of word or phrase within corpus 331 may be a representation of the word or phrase as indicated by the derived POS of the word or phrase, as indicated by the derived semantic meaning of the word or phrase, and/or as indicated by the derived syntax of the word or phrase.

In some embodiments, the clusterizer 320 may be a computer module configured to group similar corpus vectors into clusters or groups. For example, clusterizer 320 may conduct corpus vector pairwise analysis to determine the similarity of a particular corpus vector to all the other corpus vectors. In a particular implementation, the clusterizer 320 may assign a similarity score to each corpus vector within a cluster based upon that corpus vector's similarity to the other corpus vectors within the same cluster. Clusterizer 320 may utilize a static model to group a fixed number of similar corpus vectors into a particular cluster. In the static model, therefore, each cluster includes the same number of corpus vectors. Alternatively, clusterizer 320 may utilize a dynamic model to group a varying number of similar corpus vectors into a particular cluster based upon a predetermined threshold degree of similarity between such corpus vectors. In the dynamic model, therefore, the number of corpus vectors within different clusters need not be the same.

In some embodiments, the ranker 326 may be a computer module configured to sort the corpus vectors within each cluster based upon that corpus vector's similarity to the other corpus vectors within the same cluster. For example, the ranker 326 may sort the corpus vectors within each cluster by the similar score as assigned by clusterizer 320.

In embodiments, the clusterizer 320 may be a computer module further configured to designate a particular corpus vector within each cluster to be a representative vector of the cluster. For example, clusterizer 320 may designate a centroid vector as the representative corpus vector of the cluster. The centroid vector may be the mean corpus vector of the cluster. Clusterizer 320 may alternatively designate the median corpus vector of the ordered cluster vectors by similarity as the representative corpus vector of the cluster or may designate the mode corpus vector as the representative corpus vector of the cluster.

In some embodiments, the natural language processor 324 may be a computer module that may analyze text within the information corpus 331 and generate corresponding data structures for one or more portions of the text within the information corpus 331. For example, the natural language processor 324 may output data structures as a result of the analysis of the text within the information corpus 331 by tokenizer 315, POS tagger 316, semantic relationship identifier 318, syntactic relationship identifier 319, and/or vector assignor. In some embodiments, the data structure may be represented in the form of a parse tree or other graph structure. The data structure may generally define the various clusters of the corpus vectors and the representative corpus vector of each cluster.

In some embodiments, the output of the natural language processor 324 may be stored as an information corpus output 332 in one or more data sources 330. In some embodiments, data sources 330 may include data warehouses, information corpora, data models, and document repositories.

The information corpus 331 and information corpus output 332 may enable data storage and retrieval. In some embodiments, the information corpus 331 may be a storage mechanism that houses a standardized, consistent, clean, and integrated copy of text. Data stored in the information corpus 331 may be structured in a way to specifically address analytic requirements. For example, the information corpus 331 may store text based upon groups of related text (e.g., text relating to a similar subject) in order to efficiently create the information extraction dictionary. Data stored in the information corpus output 332 may also be structured in a way to specifically address analytic requirements. For example, the information corpus output 332 may store data structures that correspond with a particular text grouping of the information corpus 331 in order to efficiently create the information extraction dictionary. In some embodiments, the information corpus 331 and/or the information corpus output 332 may be a relational database.

In some embodiments, the expander 322 may be a computer module that is configured to receive the expansion query from client application 160. The expander 322 may further retrieve the word(s) or phrases(s) within the expansion query and submit those word(s) or phrases(s) to natural language processor 324 in order for the natural language processor 324 to generate the query vector(s). The query vector(s) may be stored within the data sources 330.

The expander 322 may be further configured query information corpus output 332 to determine the most similar cluster to the expansion query. The expander 322 may compare the query vector(s) to each cluster's representative corpus vector. The cluster(s) associated with the one or more of the representative corpus vectors that are most similar to the query vector(s) may be designated by the expander 322 as the most similar cluster(s) to the expansion query. Subsequent analysis by expander 322 to determine relevant or similar corpus vectors to the query vector(s) may be limited to only the designated most similar cluster(s).

Because the number of representative corpus vectors is considerably less than the overall number of corpus vectors, expander 322 may quickly determine the most similar cluster(s) relative the time needed for a natural language processing system to find the most similar corpus vectors within the entire population of corpus vectors. Further, once the most similar cluster(s) are determined by expander 322, the sample size of the number of corpus vectors to be subsequently analyzed by expander 322 for similarity to the query vector(s) is reduced relative to the entire population of corpus vectors. As such, expander 322 may efficiently determine corpus vectors that are similar to the query vector(s).

The remote device and the host device may include any commercially available or custom software (e.g., browser software, communications software, server software, natural language processing software, search engine and/or web crawling software, filter modules for filtering content based upon predefined parameters, etc.). The remote device and the host device may be distant from each other and communicate over network 130. In some embodiments, the host device may be a central hub from which the remote device can establish a communication connection, such as in a client-server networking model. Alternatively, the host device and remote device may be configured in any other suitable networking relationship (e.g., in a peer-to-peer configuration or using any other network topology).

In certain embodiments, the remote device and the host device may be local to each other and communicate via any appropriate local communication medium. For example, the remote device and the host device may communicate using a local area network (LAN), one or more hardwire connections, a wireless link or router, or an intranet. In some embodiments, the remote device and the host device may be communicatively coupled using a combination of one or more networks and/or one or more local connections. For example, the remote device may be hardwired to the host device (e.g., connected with an Ethernet cable) while a second remote device (not shown) may communicate with the host device using the network 130 (e.g., over the Internet).

In some embodiments, the network 130 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 130.

Figure 4:
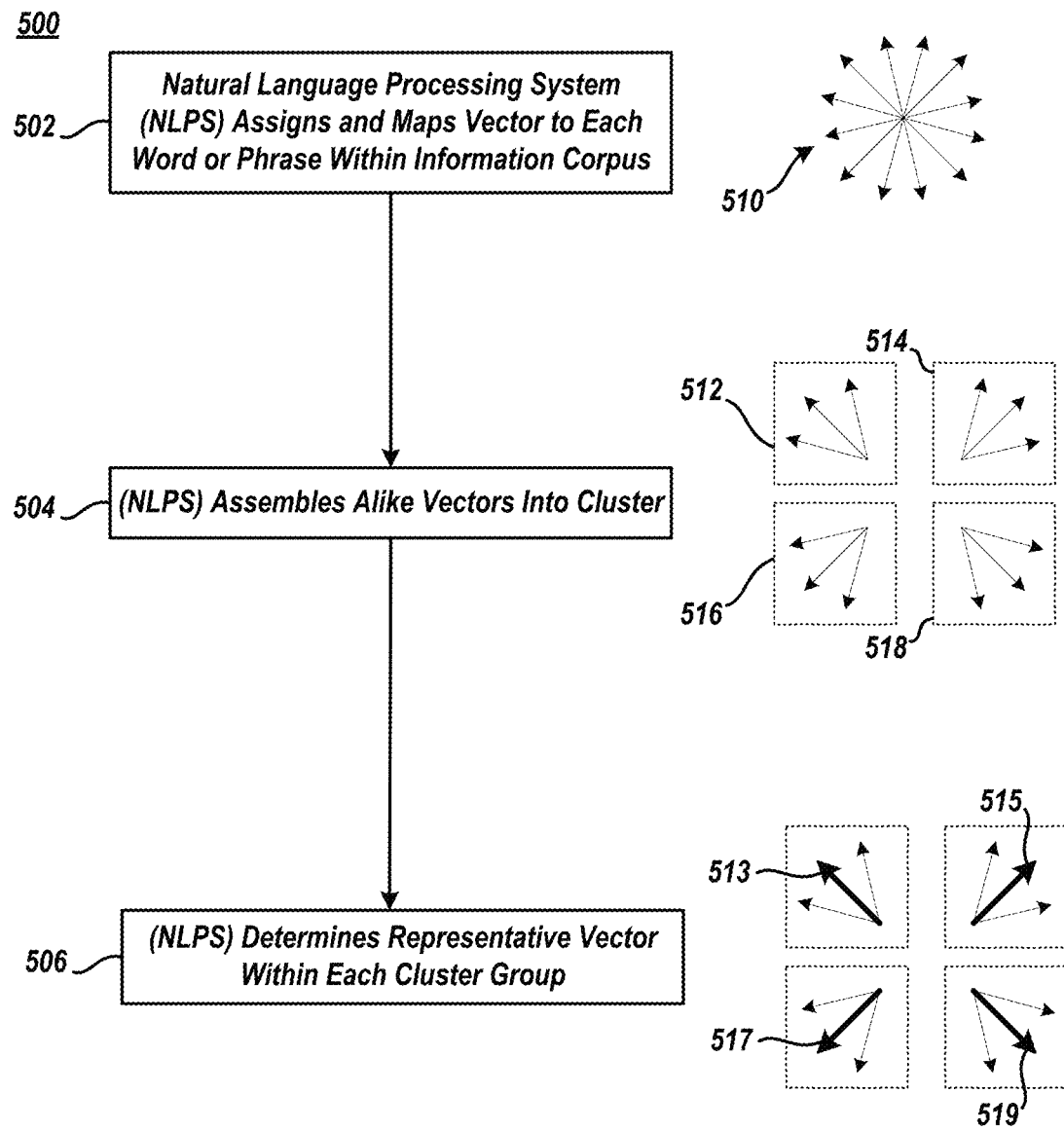
FIG. 4 depicts an exemplary method of performing an unsupervised learning of text within an information corpus to generate a vector representation of every word or phrase of the text of the information corpus, according to one or more embodiments of the present invention.

Referring to FIG. 4 which depicts a method 500 of performing an unsupervised learning of text within an information corpus 331 to generate a vector representation of every word or phrase of the text of the information corpus 331, according to one or more embodiments of the present invention. Method 500 may be exemplary implemented by a natural language processing system, a host device, a processor of the host device, or the like.

Method 500 begins and continues with a natural language processing system (NLPS) assigning and/or mapping a corpus vector to each word or phrase of text stored within information corpus 331 (block 502). The plurality of corpus vectors may be referred to collectively as corpus vectors 510. By assigning a corpus vector to each word or phrase of text within information corpus 331, the NLPS generates a machine readable representation of each word or phrase of text. Each corpus vector may include a POS component of the word or phrase, a semantic meaning component of the word or phrase, and/or a syntax component of the word or phrase, or the like. The NLPS may store the corpus vectors within one or more data structures within corpus output 332.

Method 500 may continue with the NLPS grouping similar corpus vectors into clusters (block 504). A cluster is generally a grouping of corpus vectors. For example, NLPS conducts a pairwise vector pairwise analysis to compare each particular corpus vector to the rest of the corpus vectors 510 to group similar corpus vectors into clusters. For example, NLPS analyzes corpus vectors 510 and groups similar corpus vectors into cluster 512, groups similar corpus vectors into cluster 514, groups similar corpus vectors into cluster 516, and groups similar corpus vectors into cluster 518. The NLPS may store the clustered corpus vectors within one or more data structures within corpus output 332.

Method 500 may continue with the NLPS assigning or designate a particular corpus vector within the cluster as a representative corpus vector of the cluster (block 506). The NLPS may designate a centroid vector as the representative corpus vector of the cluster, the NLPS may designate the median corpus vector as the representative corpus vector of the cluster, or the NLPS may designate the mode corpus vector as the representative corpus vector of the cluster. For example, the NLPS may designate corpus vector 513 as the representative vector of cluster 512, the NLPS may designate corpus vector 515 as the representative vector of cluster 514, the NLPS may designate corpus vector 517 as the representative vector of cluster 516, and the NLPS may designate corpus vector 519 as the representative vector of cluster 518. The NLPS may store the designated corpus vectors within one or more data structures within corpus output 332. The various data structures within corpus output 332 may be the same data structure. The data structures within corpus output 332 may be different data structures that may include one or more pointers that points or otherwise maps to distinct data structure(s). In this manner, the data structures within corpus output 332 may be organized for efficient information retrieval or processing in order to cluster the corpus vectors and designate a representative corpus vector of each cluster.

Figure 5:
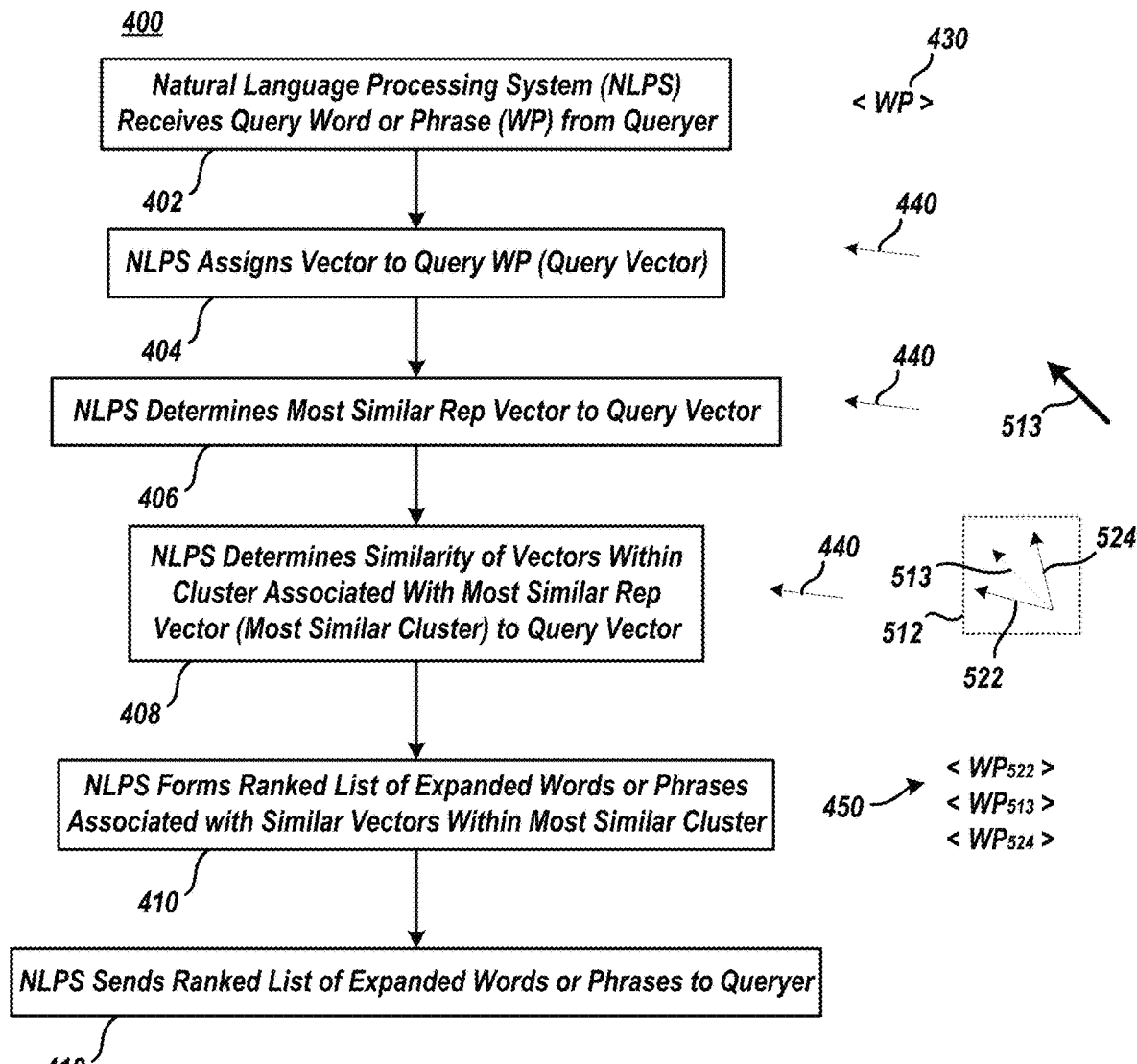
FIG. 5 depicts an exemplary method of expanding of an expansion query input dictionary input, according to one or more embodiments of the present invention.

FIG. 5 depicts an exemplary method 400 of expanding of an expansion query input, according to one or more embodiments of the present invention. Method 400 may be exemplary implemented by a natural language processing system, a host device, a processor of the host device, or the like.

Method 400 begins by a natural language processing system (NLPS) receiving an expansion query comprising word(s) or phrase(s) from a queryer (block 402). For example, the NLPS receives the expansion query from a remote device. The expansion query contains one or more words and/or one or more phrases (WP) 430. The NLPS may store, cache, or otherwise at least temporarily retain WP 430 for further analysis thereupon.

Method 400 may continue by the NLPS analyzing the WP within the expansion query in order to assign at least one query vector to the WP (block 404). For example, the NLPS assigns a query vector 440 to the WP 430. If the WP includes one word or one phrase, the NLPS may assign a single query vector to the one word or one phrase. If the WP includes multiple distinct words or distinct phrases, the NLPS may assign a query vector to each of the distinct words or distinct phrases.

When there are multiple query vectors, the NLPS may conduct further analysis to determine a relative ranking of query vectors associated with the WP, determine one or most representative query vectors of the query vectors associated with the WP, or the like. By assigning at least one query vector to the WP, the NLPS generates a machine readable representation of the expansion query. Each query vector may include a POS component of the word or phrase, a semantic meaning component of the word or phrase, and/or a syntax component of the word or phrase, or the like. The NLPS may store the one or more query vectors within one or more data structures upon a storage device local or otherwise accessible to the NLPS.

The NLPS may store, cache, or otherwise at least temporarily retain the one or more query vector(s) for further analysis thereupon.

Method 400 may continue with the NLPS determining the most similar representative corpus vector to the query vector (block 406). For example, the NLPS determines that representative corpus vector 513 is the most similar to query vector 440. As such, the NLSP may therefore determine that the cluster 512 is the most similar cluster to query vector 440. When there are multiple query vectors, the functionality of block 406 may be iteratively conducted. For example, the NLPS may determine the most similar representative vector to each of the query vectors within the ranking of query vectors. The NLPS may also determine the most similar representative corpus vector to the most representative query vectors. By determining the most similar representative corpus vector to the query vector, the cluster that which the most similar representative corpus vector is located is deemed to be the most similar cluster to the query vector. When there are more than one query vectors, there may be multiple most similar clusters, each most similar cluster being associated with at least one query vector.

The NLPS may store, cache, or otherwise at least temporarily retain the determined relationship between the most similar one or more representative corpus vectors with the one or more query vector(s) for further analysis thereupon.

Method 400 may continue with the NLPS determining the relative similarity of corpus vectors within the most similar cluster relative to the query vector (block 408). The NLPS may compare relative lengths, angles, or other geometric properties of the query vector with the applicable geometric properties of a corpus vector to determine the degree of similarity between the query vector and the corpus vector. Such degree of similarity may be a similarity score. For example, the NLPS may determine that corpus vector 522 within cluster 512 is the most similar to query vector 440, that corpus vector 513 within cluster 512 is the next most similar to query vector 440, and that corpus vector 524 within cluster 512 is the next most similar to query vector 440. For example, if a corpus vector and a query vector are exactly the same, the NLPS may determine a similarity score of 100. The differences between a corpus vector and a query vector may be associated with a quantity by the NLPS that may reduce the associated similarity score. Therefore, in certain implementations, the NLPS may rank the applicable corpus vectors by similarity scores. When there are multiple query vectors, the functionality of block 408 may be iteratively conducted for each cluster. For example, the NLPS may determine the relative similarities of the corpus vectors associated with applicable clusters under analysis.

The NLPS may store, cache, or otherwise at least temporarily retain the relative orders of similar corpus vectors within the one or more clusters for further analysis thereupon.

Method 400 may continue with the NLPS forming a ranked list of expanded words or phrases that are associated with the corpus vectors within the most similar cluster (block 410). For example, the NLPS may form an ordered list 450 of words or phrases. The word or phrase associated with corpus vector 522 may be ranked first within the list 450 because corpus vector 522 was determined to be the most similar vector to query vector 440. The word or phrase associated with corpus vector 513 may be ranked second within the list 450 because corpus vector 513 was determined to be the next most similar vector to query vector 440. The word or phrase associated with corpus vector 524 may be ranked third within the list 450 because corpus vector 524 was determined to be the next most similar vector to query vector 440.

When there are multiple query vectors, the NLPS may form a single list of expanded words or phrases that are associated with the various corpus vectors within one or more clusters. The NLPS may alternatively form multiple lists of expanded words or phrases with each list being associated with a single cluster of corpus vectors. The NLPS may store, cache, or otherwise at least temporarily retain the list(s) of expanded words or phrases.

Method 400 may continue by sending the ranked list(s) of expanded words or phrases to the queryer (block 412). For example, the NLPS sends the ranked list 450 to the remote device that sent the expansion query.

Figure 6:
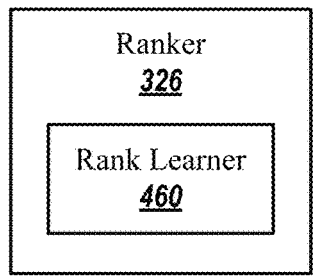
FIG. 6 illustrates a block diagram of an exemplary computing module in which embodiments of the present disclosure may be implemented.

FIG. 6 illustrates a block diagram of ranker 326 in which embodiments of the present disclosure may be implemented. In certain embodiments, ranker 326 may include a machine learning rank learner 460. In some embodiments, rank learner 460 may be a computer module that may collect and utilize user engagement data of a user interacting with a previously sent ranked list of expanded words or phrases in order to determine a ranking of expanded words or phrases in a subsequent list of expanded words or phrases. In certain implementations, the rank learner 460 may alter a previously determined similarity score between a particular corpus vector and particular query vector.

Figure 7:
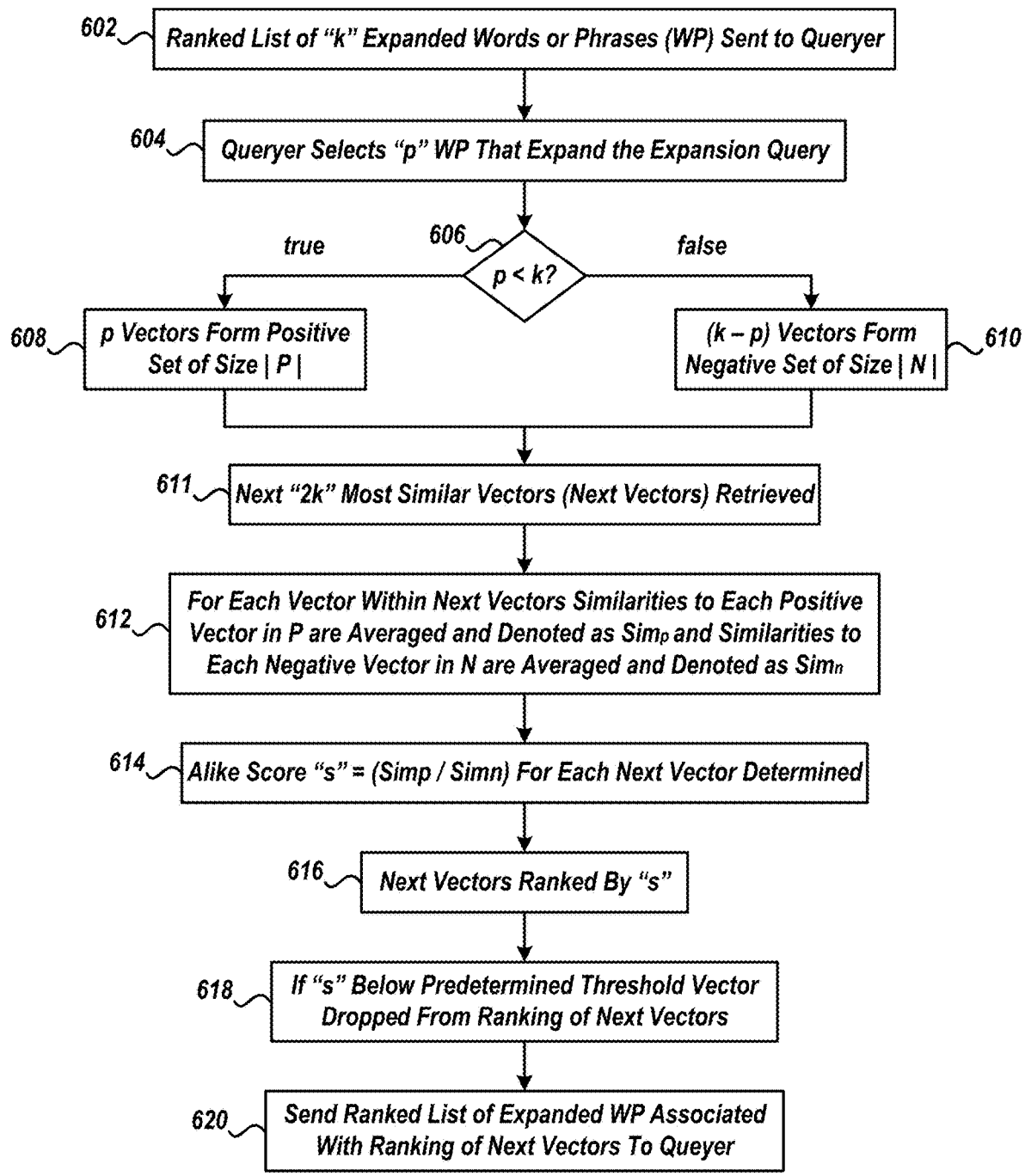
FIG. 7 depicts an exemplary method of collecting and utilizing user engagement data of a user interacting with a previously sent ranked list of expanded words or phrases in order to determine a ranking of expanded words or phrases in a subsequent list of expanded words or phrases, according to one or more embodiments of the present invention.

FIG. 7 depicts an exemplary method 600 of collecting and utilizing user engagement data of a user interacting with a previously sent ranked list of expanded words or phrases in order to determine a ranking of expanded words or phrases in a subsequent list of expanded words or phrases, according to one or more embodiments of the present invention.

Method 600 may begin with the NLPS sending a ranked list of "k" number of expanded words or phrases being to the querying device (block 602). For example, NLPS sends ranked list 450 which is a list of "k" numbered words or phrases to the remote device. The ranked list 450 is generally provided to the user thereof upon an interface of the remote device such that the user may interact with the list 450. For example, the ranked list 450 is displayed upon a touch screen of the remote device to allow the user to select (e.g. touch, click, or the like) particular words or phrases of the ranked list 450 that he or she feels that accurately expand upon the word(s) or phrase(s) of the expansion query.

Method 600 may continue with the NLPS receiving an indication that the user of the querying device has selected a number "p" of the words or phrases of the ranked list that accurately expanded upon the expansion query (block 604). For example, the user of the remote device selects those words or phrases that he or she feels that accurately expand upon the word(s) or phrase(s) of the expansion query. The user may select a send object, enter object, or next object to trigger a transmission of an electronic document from the remote device to the NLPS that indicates which words or phrases of the ranked list were selected by the user of the remote device.

In certain implementations, a similarity score which indicates the similarity between a corpus vector and the query vector may be increased, thereby indicating a higher degree of similarity, upon the NLPS determining that the user has selected the word or phrase associated with the corpus vector as an accurate expansion of the expansion query. Similarly, the similarity score may be decreased, which indicates a lower degree of similarity, upon the NLPS determining that the user has not selected the word or phrase associated with the corpus vector as an accurate expansion of the expansion query.

Method 600 may continue with the NLPS determining if the number "p" is less than the number "k" (block 606). If the number "p" is less than the number "k," the corpus vectors associated with the "p" words or phrases are determined and grouped, thereby forming a positive set of p number of corpus vectors (block 608). If the number "p" is not less than the number "k," the corpus vectors associated with the "k−p" words or phrases are determined and grouped, thereby forming a negative set of "k−p" number of corpus vectors (block 610).

Method 600 may continue by the NLPS determining the next "2k" most similar corpus vectors to the query vector that have not been previously sent to the querying device (block 611). For example, if there is no previously computed similarity scores associated therewith, the NLPS may compare relative lengths, angles, or other geometric properties of the query vector with the applicable geometric properties of the next corpus vectors to determine the degree of similarity between the query vector and the next corpus vectors. If there are preexisting similarity scores, the NLPS may obtain the group of next corpus vectors by identifying those corpus vectors that have the highest similarity scores that denote the similarity of those corpus vectors to the query vector that also have not been included within a list that has been previously sent.

Method 600 may continue with the NLPS determining an average similarity Simp for the each of the next vectors to the positive corpus vectors in set "P" and determining an average similarity Simn for each of the next vectors to the negative corpus vectors in set "N" (block 612). For example, the NLPS determines an averaged similarity score of a particular corpus vector within the list of next vectors against the positive set P of corpus vectors and an averaged similar score of the particular corpus vector against the negative set N of corpus vectors. In this manner the NLPS may determine whether the particular corpus vector within the list of next vectors against is more similar to the positive set P of corpus vectors or more similar to the negative set N of corpus vectors.

Method 600 may continue with the NLPS determine an alike score "s" for each of the next corpus vectors (block 614). The alike score "s" is defined as the value Simp divided by the value Simn. The value Simp is a value for a particular corpus vector that denotes the average similarity of that corpus vector to the positive set "P" of next corpus vectors. The value Simn is a value for the particular corpus vector that denotes the average similarity of that corpus vector to the negative set "N" of next corpus vectors. As such, for each corpus vector within the list of next vectors an alike value "s" is determined.

Method 600 may continue with the NLPS ranking the corpus vectors within the list of next vectors by alike value "s" (block 616). For example, the list of next corpus vectors are ranked from being most similar to the set "P" of positive vectors to being the most similar to the set "N" of negative vectors.

Method 600 may continue with the NLPS removing any corpus vectors within the ranked list of next corpus vectors if the alike value "s" is less than a predetermined threshold (block 618). For example, the NLPS removes any corpus vectors from the list of next vectors that are not sufficiently similar to the to the set "P" of positive vectors or, in other words, the NLPS removes any corpus vectors from the list of next vectors that are too similar to the to the set "N" of negative vectors.

Method 600 may continue with the NLPS sending an edited list of word(s) or phrase(s) associated with the ranked list of next vectors of block 618 to the querying device (block 620). For example, the NLPS forms an edited list of word(s) or phrase(s) associated with those corpus vectors that are sufficiently similar to the set P of corpus vectors and sends that list of edited words or phrases to the remote device.

In embodiments, the list of edited word(s) or phrase(s) may be subject to a next iterative round of learning. For example, the list of edited word(s) or phrase(s) may be the subject list sent in block 602, subject to the selection of block 604, and analysis of block 606-620. This iterative learning rounds may continue until the user of the querying device does not make any further selections of word(s) or phrase(s) of the associated list of word(s) or phrase(s) that accurately expanded upon the expansion query.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
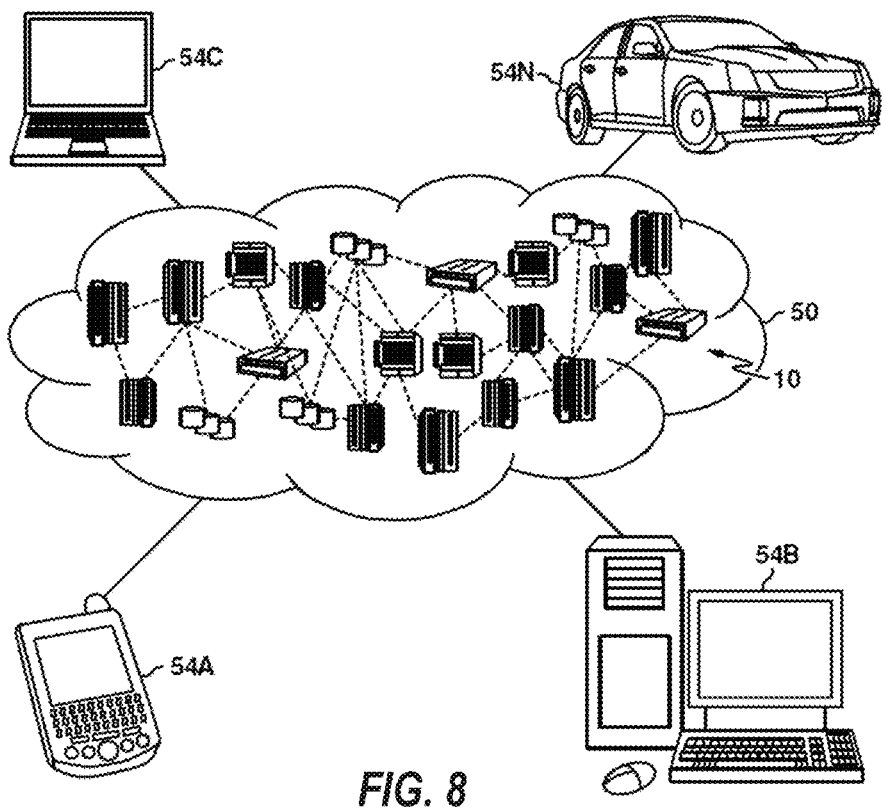
FIG. 8 depicts a cloud computing environment, according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
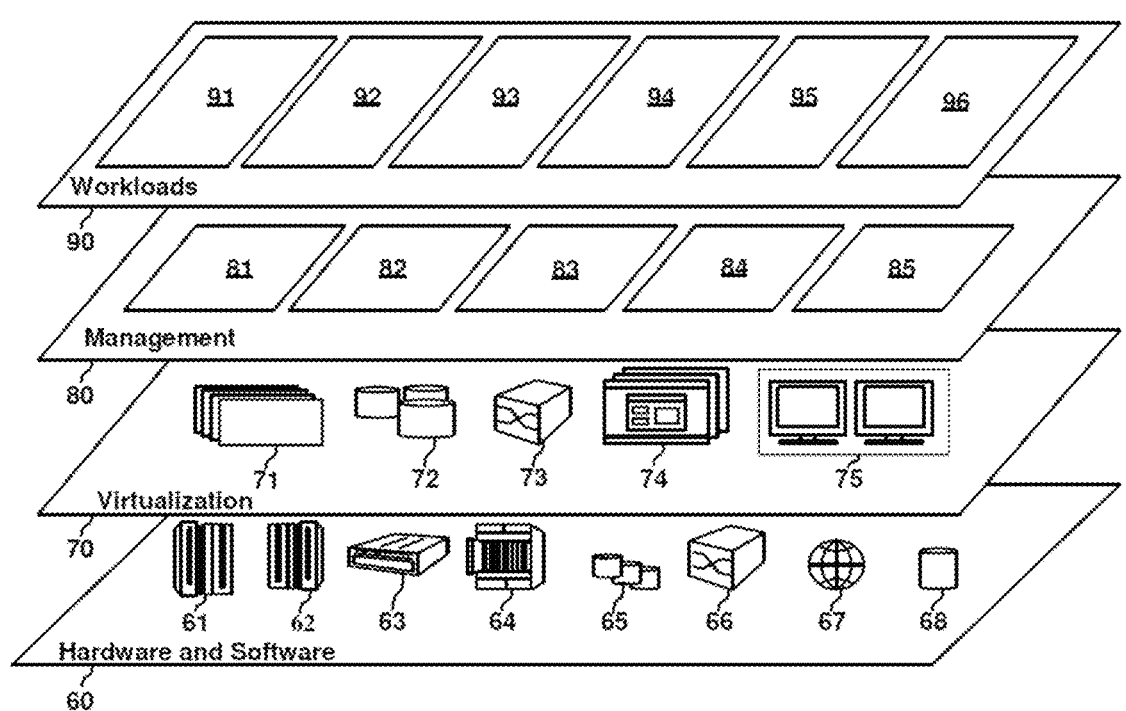
FIG. 9 depicts abstraction model layers, according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing of re-ranked results of a search query 96.

Figure 10:
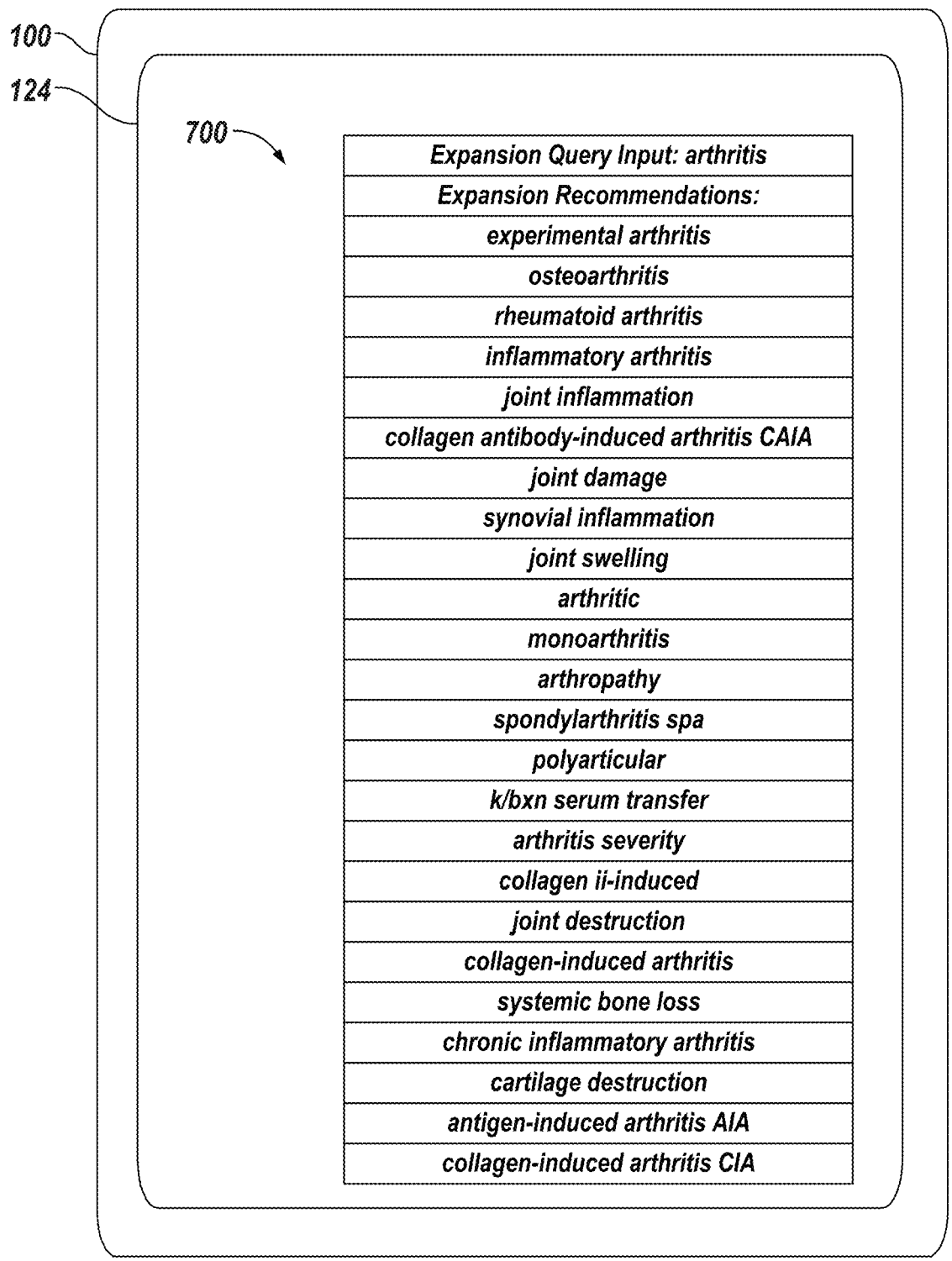
FIG. 10 depicts an exemplary graphical user interface of a client device that sends an expansion query and receives and displays a ranked list of words or phrases that may accurately expand upon the expansion query, according to one or more embodiments of the present invention.

Referring to FIG. 10 which depicts an exemplary graphical user interface of client computer 100 that sends an expansion query of "arthritis" and receives and displays a ranked list 700 of words or phrases that may accurately expand upon the expansion query, according to one or more embodiments of the present invention. The ranked list 700 may be displayed upon a display of the client device such as touch screen 124. The ranked list 700 may include an expansion query heading that may list the word(s) or phrase(s) of the expansion query. The ranked list 700 includes one or more words or phrase that were included within information corpus 331 and were deemed similar to the expansion query by the host computer 180.

The user of computer 100 may select those words or phrases in the ranked list 700 that he or she deems as an accurate expansion upon the expansion query. Such selections may be sent to the host computer 180 to increase a similarity score of the corpus vector(s) associated with the selected word(s) or phrase(s) to the expansion vector(s). The absence of selections may also be sent to host computer 180 to decrease a similarity score of the corpus vector(s) associated with the non-selected word(s) or phrase(s) to the expansion vector(s).

The selection of those words or phrases in the ranked list 700 that the user of computer 100 deems as an accurate expansion upon the expansion query may form an associated positive set "P" of corpus vectors within host device 180. The non-selection of those words or phrases in the ranked list 700 that the user of computer 100 deems as an inaccurate expansion upon the expansion query may form an associated negative set "N" of corpus vectors within host computer 180.

The positive set P of corpus vectors and the negative set N of corpus vectors may then be utilized by the host computer 180 to determine whether a new group of corpus vectors is more similar to the positive set P of corpus vectors or to the negative set N of corpus vectors. The positive set P of corpus vectors and the negative set N of corpus vectors may then be utilized by the host computer 180 to determine an alikeness score of each of the new vectors. If the alikeness score falls below the predetermined threshold, the dissimilar corpus vector is removed from the new group of corpus vectors. In this manner an edited list of new corpus vectors is made an word(s) or phrase(s) associated with the edited list may be sent to computer 100 so that the user of computer 100 may further select those words or phrases of the edited list that accurately expand upon the expansion query.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of performing an unsupervised learning of text within an information corpus to generate a vector representation of every word or phrase of the text of the information corpus, the method comprising:
   prior to the host device receiving an expansion query from a client device and determining a corresponding expansion query vector, parsing, with the host device, an information corpus that is stored within a data source local to the host system to determine each word in the information corpus and to determine whether each word in the information corpus is part of a phrase of two or more words or is a distinct word not part of a phrase;
   prior to the host device receiving an expansion query from a client device and determining a corresponding expansion query vector, determining, with the host device, a part of speech and syntax of each distinct word and syntax of each phrase;
   prior to the host device receiving the expansion query from the client device and determining a corresponding expansion query vector, assigning, with the host device, a corpus vector to each distinct word and to each phrase, wherein each corpus vector is either a geometric machine readable representation of the assigned distinct word and comprises geometric word vector components associated with the determined part of speech and determined syntax of the assigned distinct word or is a geometric machine readable representation of the assigned phrase and comprises a geometric phrase vector component associated with the determined syntax of the assigned phrase, respectively;

prior to the host device receiving an expansion query from a client device and determining a corresponding expansion query vector, forming, with the host device, a plurality of clusters, each cluster comprising a plurality of similar corpus vectors, by iteratively conducting a geometric pairwise comparison between a corpus vector and each other corpus vector and grouping pairwise compared corpus vectors together if the pairwise compared corpus vectors are similar, wherein each cluster comprises a same number of corpus vectors; and prior to the host device receiving an expansion query from a client device and determining a corresponding expansion query vector, indicating, with the host device, a preexisting corpus vector within each cluster as being a representative corpus vector of the cluster in which the preexisting corpus vector resides.

2. A computer program product for performing an unsupervised learning of text within an information corpus to generate a vector representation of every word or phrase of the text of the information corpus, the computer program product comprising a computer readable storage medium having program instructions embodied therewith, the program instructions readable by a host device to cause the host device to:

prior to the host device receiving an expansion query from a client device and determining a corresponding expansion query vector, parse an information corpus that is stored within a data source local to the host system to determine each word in the information corpus and to determine whether each word in the information corpus is part of a phrase of two or more words or is a distinct word not part of a phrase;

prior to the host device receiving an expansion query from a client device and determining a corresponding expansion query vector, determine a part of speech and syntax of each distinct word and syntax of each phrase;

prior to the host device receiving the expansion query from the client device and determining a corresponding expansion query vector, assign a corpus vector to each distinct word and to each phrase, wherein each corpus vector is either a geometric machine readable representation of the assigned distinct word and comprises geometric word vector components associated with the determined part of speech and determined syntax of the assigned distinct word or is a geometric machine readable representation of the assigned phrase and comprises a geometric phrase vector component associated with the determined syntax of the assigned phrase, respectively;

prior to the host device receiving an expansion query from a client device and determining a corresponding expansion query vector, form a plurality of clusters, each cluster comprising a plurality of similar corpus vectors, by iteratively conducting a geometric pairwise comparison between a corpus vector and each other corpus vector and grouping pairwise compared corpus vectors together if the pairwise compared corpus vectors are similar, wherein each cluster comprises a same number of corpus vectors; and prior to the host device receiving an expansion query from a client device and determining a corresponding expansion query vector, indicate a preexisting corpus vector within each cluster as being a representative corpus vector of the cluster in which the preexisting corpus vector resides.

3. A computer for performing an unsupervised learning of text to generate a vector representation of every word or phrase of the text, the computer comprising:

a processor;

an information corpus stored within a data source communicatively coupled to the processor; and a memory communicatively coupled to the processor, wherein the memory is encoded with instructions, wherein the instructions when executed by the processor cause the processor to:

prior to the host device receiving an expansion query from a client device and determining a corresponding expansion query vector, parse the information corpus that is stored within a data source to determine each word in the information corpus and to determine whether each word in the information corpus is part of a phrase of two or more words or is a distinct word not part of a phrase;

prior to the host device receiving an expansion query from a client device and determining a corresponding expansion query vector, determine a part of speech and syntax of each distinct word and syntax of each phrase;

prior to the host device receiving the expansion query from the client device and determining a corresponding expansion query vector, assign a corpus vector to each distinct word and to each phrase, wherein each corpus vector is either a geometric machine readable representation of the assigned distinct word and comprises geometric word vector components associated with the determined part of speech and determined syntax of the assigned distinct word or is a geometric machine readable representation of the assigned phrase and comprises a geometric phrase vector component associated with the determined syntax of the assigned phrase, respectively;

prior to the host device receiving an expansion query from a client device and determining a corresponding expansion query vector, form a plurality of clusters, each cluster comprising a plurality of similar corpus vectors, by iteratively conducting a geometric pairwise comparison between a corpus vector and each other corpus vector and grouping pairwise compared corpus vectors together if the pairwise compared corpus vectors are similar, wherein each cluster comprises a same number of corpus vectors; and prior to the host device receiving an expansion query from a client device and determining a corresponding expansion query vector, indicate a preexisting corpus vector within each cluster as being a representative corpus vector of the cluster in which the preexisting corpus vector resides.

\* \* \* \* \*